United States Patent [19]

Ferrell et al.

[11] Patent Number: 5,714,208
[45] Date of Patent: Feb. 3, 1998

[54] REPAIR SYSTEM AND METHOD OF PATCHING ARTICLES

[76] Inventors: Troy A. Ferrell, 519 Stonehenge Dr., Lebanon, Tenn. 37090; Charles L Davis, 1157 Bryson Rd., Woodbury, Tenn. 37190

[21] Appl. No.: 581,222

[22] Filed: Dec. 29, 1995

[51] Int. Cl.$^6$ ..................................................... B05D 3/06
[52] U.S. Cl. ..................... 427/558; 156/94; 206/229; 206/302; 206/582; 427/140
[58] Field of Search .................. 156/94, 98; 206/229, 206/302, 582; 264/36; 427/140, 558

[56] References Cited

U.S. PATENT DOCUMENTS

| | | | |
|---|---|---|---|
| 4,533,715 | 8/1985 | Lee et al. | 528/45 |
| 5,086,149 | 2/1992 | Baron et al. | 528/45 |
| 5,145,541 | 9/1992 | Baron et al. | 156/98 |
| 5,191,039 | 3/1993 | Maruno et al. | 525/531 |
| 5,204,378 | 4/1993 | Maruno et al. | 522/39 |
| 5,295,541 | 3/1994 | Ng et al. | 166/277 |
| 5,348,764 | 9/1994 | Yokoshima | 427/140 |

*Primary Examiner*—Michael Lusignan
*Attorney, Agent, or Firm*—Waddey & Patterson; Laura K. Thomas

[57] ABSTRACT

A repair kit comprising fiber reinforced patching material impregnated with an ultra-violet light activated resin contained in a sealed package. In the preferred embodiment, the patching materials include a first piece of fiber reinforced material having randomly arranged fiber filaments or strands (i.e. a mat), and a second piece of fiber reinforced material having uniformly oriented fiber filaments (i.e. a cloth or roving). The impregnated first and second pieces of fiber reinforced material form a substantially inseparable, unitary patch when impregnated with the resin. The patch may also comprise a fiber reinforced mat and any variety of fiber reinforced cloth or roving attached thereto to form a single piece of fiber reinforced material such that the fiber filaments on one side of the patch are randomly arranged and the fiber filaments on the opposing side are uniformly oriented. The package containing the impregnated patching materials comprises oppositely disposed layers sealed together along a periphery to form a pocket for containing the patch and the resin. The package is impervious to ultra-violet light and chemicals to prevent exposure of the resin to ultra-violet light and to preserve the efficacy of the resin, respectively. The kit includes a paddle attached to the package for smoothing the patching materials to the area being repaired. An alternate embodiment of the kit may include protective gloves for preventing direct contact of the resin to the skin.

20 Claims, 1 Drawing Sheet

5,714,208

REPAIR SYSTEM AND METHOD OF PATCHING ARTICLES

BACKGROUND OF INVENTION

1. Field of the Invention

The present invention relates generally to repair systems and kits for repairing holes or surface defects in articles, but more particularly to such repair kits containing fiber reinforced patching materials impregnated with an ultra-violet activated polyester resin.

2. Description of the Related Art

The art to which the present invention relates includes repair systems in which an ultra-violet activated resin is used to bond fiber reinforced patching materials to articles to be patched or repaired.

As people engage in the various pursuits of life, both personal and professional, they often employ articles, equipment or devices (hereinafter "articles") designed to assist or facilitate their performance of a task or their enjoyment of leisure time. The wear and tear to which such articles are subjected during use often results in damage in the form of punctures, holes, surface abrasions, etc. that may render the articles inoperable or unusable. For example, the trailer of a tractor-trailer may be punctured due to the shifting of loads during transit, or the hull of watercraft may be damaged due to impact with submerged objects. Such damage may arise under circumstances that create an emergency situation and, thus require immediate repair. Oftentimes, however, the materials necessary to effect a repair may not be readily available at the time or place that the damage occurs. Accordingly, it would be desirable to develop a convenient means for effecting the immediate, on-site repair of articles constructed of various materials, including fiberglass, metals, wood and plastics.

U.S. Pat. Nos. 5,086,149 and 5,145,541 granted to Baron et al., incorporated by reference as if fully set forth herein, are directed to a low energy cured composite repair system. Baron et al. discloses a fiber reinforced resin matrix composite material repair system employing a specified catalyst with a multifunctional epoxy resin. The resin is sealed in a water-proofed environment prior to being coated onto a fiber reinforcement to protect the resin from moisture.

Baron et al. teaches a method for repairing articles constructed of fiber reinforced composites using a thermo-cured resin/catalyst system. In order to effect a repair, a repair patch must first be prepared by impregnating a fiber reinforcement with the resin/catalyst system using conventional technologies, such as hot melt impregnation. An epoxy adhesive is applied to the surface surrounding the excised damaged portion, and the repair patch is applied thereover. A release film is applied over the wet patch. The Baron et al. resin system requires that pressure and heat be applied for a time sufficient to cure the resin system.

Under applied vacuum (e.g. 15 psi max.) the cure temperature may be reached directly, without an involved cure profile or cycle. A heating period of 2–3 hours at 200° F. is sufficient to reach a cure state where tensile compression, short beam shear and flexural tests give values equivalent to the original epoxy resin composite.

The list that follows is directed to patents for repair systems using resins found in the related art.

| U.S. Pat. No. | Inventor |
|---|---|
| 5,204,378 | Maruno et al. |
| 5,191,039 | Maruno et al. |
| 5,348,764 | Yokoshima |
| 5,295,541 | Ng et al. |

Until now, it is believed that a self-contained repair system comprising fiber reinforced patching materials impregnated or otherwise saturated with an ultra-violet activated polyester resin contained in a kit has not been invented.

SUMMARY OF THE INVENTION

The present invention is directed to a self-contained repair kit or system comprising a patch impregnated or otherwise saturated with an ultra-violet light activated resin for repairing damaged articles. The patch of the present invention preferably comprises two pieces of fiber reinforced material, of any desired size, weight or configuration, impregnated with resin to form an inseparable, unitary patch. However, other suitable materials are contemplated to be within the scope of the present invention. One of the pieces of fiber reinforced material is constructed of what is commonly referred to in the industry as fiber reinforced mat wherein the fiber filaments or strands are randomly oriented. The other piece of fiber reinforced material is preferably constructed of any type of commercially available fiber reinforced cloth or roving wherein the fiber filaments or strands are uniformly oriented. However, it is contemplated that the patch may also comprise a fiber reinforced mat and any variety of fiber reinforced cloth or roving physically attached thereto to form a single piece of fiber reinforced material. Of course, these embodiments are not intended to be limiting; accordingly, the patch may comprise any desirable combination of a fiber reinforced mat, wherein the fiber filaments or strands are randomly arranged, and any variety of fiber reinforced cloth or roving, wherein the fiber filaments or strands are uniformly oriented, whether separate or physically attached in some manner.

The resin of the present invention includes any variety of resin that cures when exposed to ultra-violet light for a sufficient period of time. Accordingly, no heat source is required to activate the curing process. The onsite repair of an article can be easily effected because sustained heat and pressure, which are required in systems incorporating a thermo-cured resin, are not required to cure the resin of the present invention. The user simply opens the package containing the resin impregnated patch, immediately applies the patch to the damaged article, and exposes the patch to an ultra-violet light source, such as the sun, until the resin cures.

Unlike thermo-cured resin systems, the impregnated patching materials of the present invention are sealed in a package or bag constructed of a material that is impervious to ultra-violet light, such as laminated foil or other suitable materials, to prevent premature exposure and/or curing of the resin and impregnated patching materials. The material from which the package is constructed is also impervious to chemicals in order to preserve the efficacy of the resin. Thus, the package includes both light and chemical barriers. The sealed, self-contained package or bag also facilitates ease of handling and storage.

The package or bag may be constructed according to any suitable method of manufacture to form a pouch or pocket to contain the resin and patch. For example, the package may be constructed from two opposing layers of a suitable material sealed together along a periphery to form a pouch. Alternatively, the package or bag may be formed of one piece of material folded over and sealed along its open edges to form a pouch. Moreover, other methods of constructing a sealed package to prevent leakage of the contents are contemplated to be within the scope of the present invention. The interior of the package is substantially the same size as the patch contained therein to prevent excessive flow and pooling of the resin within the package.

The kit may also include a paddle useful for applying the patch to the area of the article to be repaired, and protective gloves to prevent direct contact of the resin with the skin.

The inventive repair system is suitable for repairing articles constructed of a variety of materials, including fiber reinforced composite materials, wood, plastic, and metals, including aluminum.

The inventive method includes the steps of preparing the surface of the article to be repaired, providing a patch impregnated with an ultra-violet light activated resin sealed in a package having light barrier means and chemical barrier means, applying the resin-impregnated patch to the repair area, smoothing the patch, and exposing the patched area to ultra-violet light. The step of providing a patch may include providing a first piece of fiber reinforced material having randomly arranged filaments and a second piece of fiber reinforced material having uniformly oriented filaments. In the preferred method, the patch is applied to the article to be repaired such that the side of the patch having the randomly arranged filaments directly engages the surface of the article to achieve optimum bonding. Accordingly, the side of the patch having the uniformly oriented filaments is exposed to form the exterior surface of the patch.

The present invention may, therefore, be summarized in a variety of ways, one of which is the following: a repair kit for patching articles comprising in a package A repair kit for patching articles comprising in a package: a patch and an ultra-violet light activated resin saturating the patch.

The package includes means for preventing exposure of the resin to ultra-violet light and for preserving the efficacy of the resin. Thus, the package is constructed from a material, such as laminated foil, that is impervious to ultra-violet light and to chemicals. The package further comprises oppositely disposed layers sealed together along a periphery to form a pocket, and each layer has an exterior surface and an interior resin-contacting surface. The package is preferably welded along the periphery, and may also be vacuum sealed.

The package further includes indicia for indicating a side of the package adjacent the first piece of fiber reinforced material having the randomly arranged filaments, and a side of the package adjacent the second piece of fiber reinforced material having the uniformly oriented filaments to indicate a workpiece engaging surface and a top surface of the patch, respectively.

The patch further comprises a first piece of fiber reinforced material having fiber filaments that are randomly arranged; and a second piece of fiber reinforced material having fiber filaments that are uniformly oriented. The first piece and second piece of fiber reinforced material may be attached together to form a single piece of material.

The kit may further comprise a smoothing paddle and protective gloves.

Yet another way of summarizing the present invention is: a method of repairing articles comprising the steps of providing a patch impregnated with an ultra-violet light activated resin and sealed in a package that is is impervious to ultra-violet light to prevent the resin from curing in response to incident ultra-violet radiation, the package having oppositely disposed layers sealed together along a periphery to form a pocket; opening the package to expose the resin impregnated patch; positioning the resin impregnated patch on the article to be repaired; and exposing the resin to ultra-violet light to cure the resin.

The step of providing a patch may further include the step of providing a first piece of fiber reinforced material having randomly arranged fiber filaments and a second piece of fiber reinforced material having uniformly oriented fiber filaments; wherein the first piece of fiber reinforced material forms a workpiece engaging surface of the patch and the second piece of fiber reinforced material forms a top surface of the patch.

The step of positioning the patch on the article to be repaired further includes positioning the patch on the article such that the workpiece engaging surface of the patch directly engages the article, and the top surface of the patch forms an exterior surface of the patch. Moreover, the step of positioning the patch on the article may further include the step of cleaning and sanding an area of the article to be repaired.

The method may further include the steps of providing a smoothing paddle for smoothing the mat and the cloth, and providing gloves to be worn by a user to protect the user's hands from contact with the resin.

A third way of describing the present invention is: a system for repairing articles, comprising a sealed package containing fiber reinforced patching material impregnated with an ultra-violet light activated resin; the package includes light barrier means for preventing exposure of the patching materials and resin to ultra-violet light and chemical barrier means for preserving the efficacy of the resin.

The patching material of the system further comprises a mat constructed of fiber reinforced material having randomly arranged filaments; and a cloth constructed of fiber reinforced material having uniformly oriented filaments; wherein the mat forms a workpiece engaging surface of the patch and the cloth forms a top surface of the patch.

The package of the system futher includes indicia for indicating a side of the package adjacent the workpiece engaging surface of the patch and a side of the package adjacent the top surface of the patch.

The system may further comprise a smoothing paddle for smooting the patch and protective gloves to be worn by a user to protect the user's hands from contact with the resin.

It is an object of the invention to provide a self-contained kit for effecting on-site repairs to damaged articles constructed of fiberglass, metal, wood, plastic, etc.

It is an object of the invention to provide a repair kit comprising fiber reinforced patching materials impregnated with an ultra-violet activated resin and contained in a sealed package constructed of a material that is impervious to chemicals and ultra-violet light.

It is an object of the invention to provide a system for repairing damaged articles having holes, punctures, surface abrasions, leaks, etc.

It is an object of the invention to provide a repair kit comprising a fiber reinforced mat wherein the fiber filaments have a random arrangement, and a fiber reinforced cloth wherein the fiber filaments have a uniform orientation, and wherein the mat and cloth are impregnated with an ultra-violet activated polyester resin and contained in a sealed package that is impervious to ultra-violet light and chemicals for preventing premature curing of the resin and for preserving the efficacy of the resin.

It is an object of the invention to provide a repair system containing patching materials that will cure upon exposure to ultra-violet light.

These and other objects, features and advantages shall become apparent after consideration of the description and drawings set forth herein. All such objects, features and advantages are contemplated to be within the scope of the present invention even though not specifically set forth herein.

DESCRIPTION OF THE PREFERRED EMBODIMENTS

Figure 1:
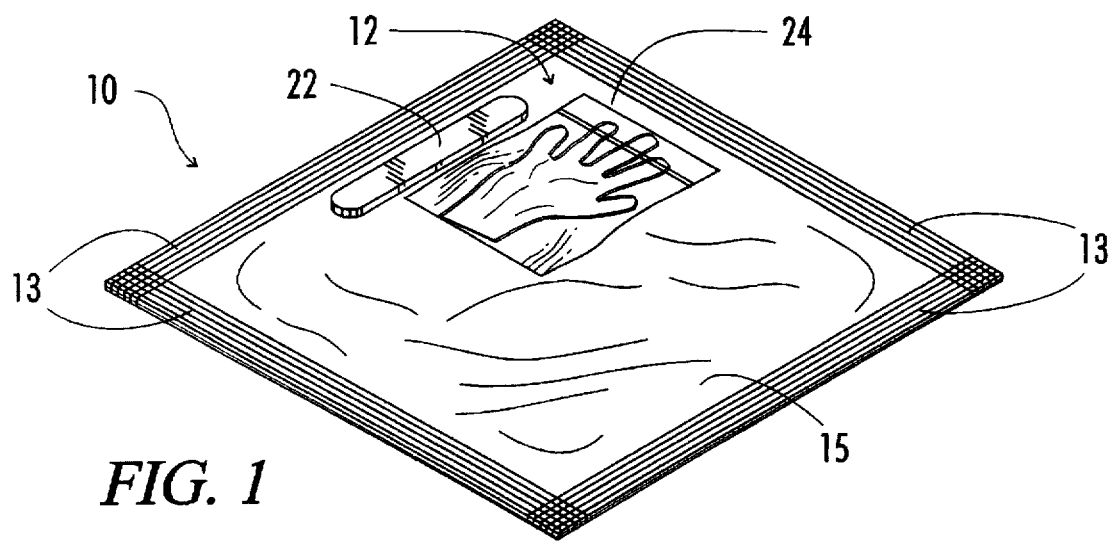
FIG. 1 is a perspective view of an embodiment of the present invention.
Figure 2:
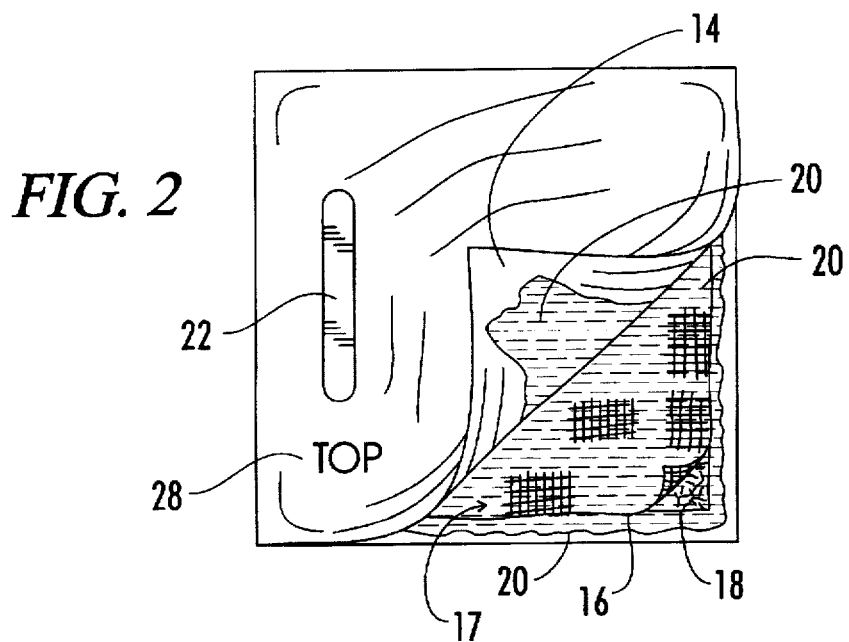
FIG. 2 is a top view of an alternate embodiment of the present invention.

An inventive repair kit is designated generally by the reference numeral 10 in FIGS. 1 and 2. The inventive kit includes a patch 17 contained within a sealed package or bag 12 having edges 13, an interior 14 and an exterior 15. The patch prefereably comprises a first piece 16 and a second piece 18 of fiber reinforced material of any desired size, weight or configuration, which are applied to an article 26 to be repaired to form an inseparable, unitary patch 17. In the preferred embodiment, the first piece of fiber reinforced material 16 is constructed of what is referred to in the industry as fiber reinforced mat, wherein the fiber filaments or strands have a random arrangement. The second piece of fiber reinforced material 18 is preferably constructed of any variety of fiber reinforced cloth or roving, wherein the fiber filaments or strands have a uniform orientation. Alternatively, the patch 17 may comprise a piece of mat 16 and a piece of cloth or roving 18 attached together to form a single piece of fiber reinforced material such that the fiber filaments on one side of the patch have a random arrangement and the fiber filaments on the opposing side have a uniform orientation. Thus, the patch 17 may comprise any desirable combination of a fiber reinforced mat 16, having randomly arranged filaments, and any variety of fiber reinforced cloth or roving 18, having uniformly oriented filaments, whether formed of separate pieces of fiber reinforced material or of a single piece of fiber reinforced material wherein the mat and cloth are attached together.

Figure 3:
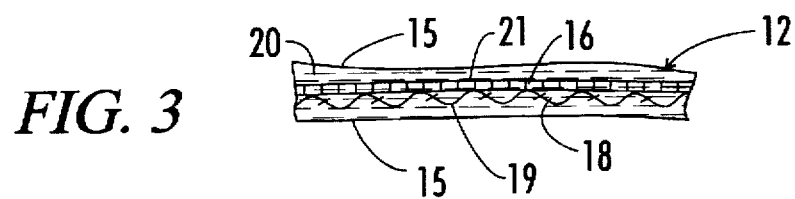
FIG. 3 is a cross-sectional view of the embodiment of the invention shown in FIG. 1.

With reference to FIGS. 2 and 3, the patch 17 comprising fiber reinforced materials 16 and 18 as described above is impregnated with an ultra-violet light activated resin 20. In the case where the patch 17 is formed of two separate pieces of fiber reinforced material (i.e. a mat having a randomly arranged filaments and a cloth or roving having uniformly oriented filaments), the two pieces of material form a substantially inseparable, unitary patch when impregnated with the resin 20 (see FIG. 3). Accordingly, in either embodiment, the patch 17 includes a top surface 19 and a workpiece engaging surface 21. The first piece of fiber reinforced material 16 having the randomly arranged filaments (i.e. the mat) comprises the workpiece engaging surface 21 of the patch 17, and the second piece of fiber reinforced material 18 having the uniformly oriented filaments (i.e. the cloth or roving) comprises the top surface 19 of the patch 17.

The package or bag 12 containing the patch 17 is constructed of a material that is impervious to ultra-violet light and chemicals. In the preferred embodiment, the package or bag 12 is constructed of a laminated foil material that is impervious to ultra-violet light in order to prevent premature exposure and curing of the resin and resin impregnated patch. The package or bag 12 includes an inner layer adjacent the resin and patching materials that serves as a chemical barrier to preserve the efficacy of the resin contained therein.

In the preferred embodiment, the interior 14 of the package 12 is substantially the same size as the patch 17 contained therein to prevent pooling or accumulation of the resin 20 away from the patch 17. The package 12 preferably comprises oppositely disposed layers of a suitable material sealed together along a periphery to form a pocket for receiving the patch 17 and the resin 20. The edges 13 of the package 12 are welded by heat sealing, for example, to prevent any leakage of the resin 20 therefrom. However, the package 12 may be sealed according to any suitable method in order to prevent leakage of the resin 20. In an alternate embodiment of the invention, the package 12 containing the patch 17 is vacuum sealed to restrict the flow of the resin 20 within the package 12.

The preferred embodiment of the package 12 includes indicia 28 indicating a side of the package 12 adjacent the top surface 19 of the patch 17, i.e. the surface having the uniformly oriented filaments, and a side of the package 12 adjacent the workpiece engaging surface 21 of the patch 17, i.e. the surface having the randomly arranged filaments, to assist in application of the patch 17 as described below.

The kit 10 includes a paddle 22 for smoothing the patching materials 16 and 18 after they are applied to an article being repaired. In the preferred embodiment, the paddle 22 is constructed of wood; however, other suitable materials, such as plastic or metal, are contemplated to be within the scope of the invention. The paddle 22 is preferably attached to the exterior 15 of the package 12 using an adhesive or other suitable means of attachment. Alternatively, the paddle 22 may be contained within a separate compartment of the package 12.

As shown in FIG. 1, an alternate embodiment of the present invention may include protective gloves 24 to protect a user's hands from direct contact with the resin 20 during application of the patch 17.

MODE OF OPERATION

To repair a damaged portion of an article 26, such as a hole or surface defect in the body or hull of a watercraft, the user should first clean and sand the entire area to be covered by the patch 17. The package 12 containing the resin-impregnated patch 17 is cut inside the sealed edges 13 on all sides of the package 12.

The appropriate side of the package 12 is peeled away from the patch 17 to reveal the workpiece engaging surface 21 of the patch 17. The paddle 22 is used to separate the patch 17 from the interior 14 of the package 12. As optimum bonding is achieved when workpiece engaging surface of the patch 17 directly engages the surface of the article 26 being repaired, the patch 17 is applied to the article 26 such that the workpiece engaging surface 21 is positioned directly adjacent the article 26 to be repaired. The top surface 19 of the patch 17, i.e. the side having the uniform filament pattern, forms the exterior surface of the patch 17. The patch 17 is smoothed over the repair area using the paddle 22 until any entrapped air bubbles are removed and the edges of the patch 17 are flat.

After the patch 17 is applied to the article 26, the repaired area is exposed to an ultra-violet emitting light source for a period of time sufficient for the resin 20 to cure. The interior 14 of the package 12 should also be exposed to ultra-violet light to cure any resin 20 remaining therein so that the package 12 may be disposed of properly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected by the appended claims.

What is claimed is:

1. A repair kit for patching articles comprising in a package:

a patch;

an ultra-violet light activated resin saturating the patch;

the package includes means for preventing exposure of the resin to ultra-violet light and for preserving the efficacy of the resin.

2. The kit of claim 1 wherein the patch further comprises:

a first piece of fiber reinforced material having fiber filaments that are randomly arranged; and a second piece of fiber reinforced material having fiber filaments that are uniformly oriented.

3. The kit of claim 2 wherein the first piece and second piece of fiber reinforced material are attached together.

4. The kit of claim 1 further comprising:

a smoothing paddle.

5. The kit of claim 1 wherein the package further comprises:

oppositely disposed layers sealed together along a periphery to form a pocket, each layer has an exterior surface and an interior resin-contacting surface.

6. The kit of claim 1 wherein the package is partially constructed of a foil material.

7. The kit of claim 5 wherein the package is welded along the periphery.

8. The kit of claim 5 wherein the pocket contains the patch and the resin and the package is vacuum sealed.

9. The kit of claim 1 further comprising:

protective gloves.

10. The kit of claim 5 wherein the package further includes:

indicia for indicating a side of the package adjacent the first piece of fiber reinforced material having the randomly arranged filaments, and a side of the package adjacent the second piece of fiber reinforced material having the uniformly oriented filaments to indicate a workpiece engaging surface and a top surface of the patch, respectively.

11. A method of repairing articles comprising the steps of:

providing a patch impregnated with an ultra-violet light activated resin and sealed in a package that is is impervious to ultra-violet light to prevent the resin from curing in response to incident ultra-violet radiation, the package having oppositely disposed layers sealed together along a periphery to form a pocket;

opening the package to expose the resin impregnated patch;

positioning the resin impregnated patch on the article to be repaired; and exposing the resin to ultra-violet light to cure the resin.

12. The method of claim 11 wherein the step of providing a patch further includes the step of:

providing a first piece of fiber reinforced material having randomly arranged fiber filaments and a second piece of fiber reinforced material having uniformly oriented fiber filaments;

wherein the first piece of fiber reinforced material forms a workpiece engaging surface of the patch and the second piece of fiber reinforced material forms a top surface of the patch.

13. The method of claim 12 wherein the step of positioning the patch on the article to be repaired further includes:

positioning the patch on the article such that the workpiece engaging surface of the patch directly engages the article, and the top surface of the patch forms an exterior surface of the patch.

14. The method of claim 11 further including the step of:

providing a smoothing paddle for smoothing the mat and the cloth.

15. The method of claim 11 further including the step of:

providing gloves to be worn by a user to protect the user's hands from contact with the resin.

16. The method of claim 11 such that the step of positioning the patch on the article further includes the step of:

cleaning and sanding an area of the article to be repaired.

17. A system for repairing articles, comprising:

a sealed package containing fiber reinforced patching material impregnated with an ultra-violet light activated resin;

the package includes light barrier means for preventing exposure of the patching materials and resin to ultra-violet light and chemical barrier means for preserving the efficacy of the resin.

18. The system of claim 17 wherein the patching material further comprises:

a mat constructed of fiber reinforced material having randomly arranged filaments; and a cloth constructed of fiber reinforced material having uniformly oriented filaments;

wherein the mat forms a workpiece engaging surface of the patch and the cloth forms a top surface of the patch.

19. The system of claim 18 further comprising:

indicia for indicating a side of the package adjacent the workpiece engaging surface of the patch and a side of the package adjacent the top surface of the patch.

20. The system of claim 17 further comprising:

a smoothing paddle; and protective gloves.

* * * * *